US005650668A

United States Patent [19]

Hellman et al.

[11] Patent Number: 5,650,668

[45] Date of Patent: Jul. 22, 1997

[54] LOW CURRENT VOLTAGE REGULATOR CIRCUIT

[75] Inventors: Bengt Harry Hellman, Indianapolis; Heather Marie Newlin, West Lafayette, both of Ind.

[73] Assignee: Lucent Technologies Inc., Murray Hill, N.J.

[21] Appl. No.: 494,609

[22] Filed: Jun. 23, 1995

[51] Int. Cl.[6] .................................................. H02J 7/00

[52] U.S. Cl. ................................ 307/64; 307/43; 307/46; 307/48; 307/52

[58] Field of Search ................................ 307/45, 46, 48, 307/52, 62, 64, 55, 56, 60; 323/245, 293, 294, 352, 303, 364; 379/66, 90, 307, 322, 323, 324

[56] References Cited

U.S. PATENT DOCUMENTS

| | | | |
|---|---|---|---|
| 3,947,753 | 3/1976 | Gushima et al. | 323/21 |
| 4,140,962 | 2/1979 | Quinn | 323/21 |
| 4,613,809 | 9/1986 | Skovmand | 323/268 |
| 4,906,913 | 3/1990 | Stanojevic | 323/303 |
| 4,995,072 | 2/1991 | Pedigo | 379/61 |

*Primary Examiner*—William M. Shoop, Jr.
*Assistant Examiner*—Kim Lockett
*Attorney, Agent, or Firm*—Thomas Stafford; Brian Dinicola

[57] ABSTRACT

A power supply for regulating energy delivered to a power consuming apparatus operating at low current levels includes a power source comprising at least one battery for generating an output voltage greater than a desired operating level. The power supply further includes a voltage regulator circuit comprising a light emitting diode (LED). The light emitting diode, which is preferably configured as a gallium arsenide diode, operates at a substantially constant voltage within a current range of between 10 to 25 micro amps. As a result, reliable and economical voltage regulating circuits can be constructed with substantially improved performance, as compared to circuits utilizing zener diodes as the active voltage regulating component, at the very low current levels required for such applications as line powered telecommunication devices.

8 Claims, 6 Drawing Sheets

LOW CURRENT VOLTAGE REGULATOR CIRCUIT

TECHNICAL FIELD

This invention relates to electronic voltage regulation. A voltage regulator can be fold in virtually every piece of electronic equipment. A voltage regulator has an input terminal and a ground terminal for connection to a source of input voltage, and operates to maintain a constant regulated output voltage at an output terminal.

BACKGROUND OF THE INVENTION

A voltage regulator can be designed either as a positive voltage regulator or a negative voltage regulator. For convenience, this invention will be described as it relates to a positive voltage regulator, although it will be clear to one skilled in the a how to apply the invention to a negative regulator by appropriate reversal of voltage polarities and use of complementary transistor types.

In a positive voltage regulator, the input voltage V IN must be larger than the desired output voltage V OUT, by an increment known as the "dropout voltage." If V IN is too low, the regulator will be unable to hold V OUT to the desired level. If V IN should then fall, V OUT must fall as well. A low dropout voltage is important, for example, in battery powered equipment where it is desirable to maintain V OUT at its designed level for as long as possible as the battery voltage falls. In today's low dropout voltage regulators, the dropout voltage can be as low as 500 millivolts.

Heretofore, the zener diode has been the primary component of a voltage regulating circuit. Zeners are supplied for a quoted voltage, which is always defined at a given resistance current Iz. At this current, it will be within the specified tolerance, but at other currents it will differ, the difference being a function of the zener slope resistance Rs. Over some range of Iz, Rs can be assumed to be fairly linear. As the current decreases, however, the characteristic approaches the "knee" of the curve and Rs increases sharply. There is very little point in operating a zener intentionally on the knee. The actual knee current depends on the type and voltage but is rarely less than a few hundred μA. In fact, zener diodes are typically rated for currents in milliamps—most are rated for currents of 3 mA to 250 mA. Consequently, zeners are not much use for micropower circuits.

In certain line powered telephone devices, in which the voltage is typically regulated to 3 volts, the current level may be as low as 10 to 25 μA, or even less. The commercially available zener diode closest to meeting this requirement is rated for 2.7 V at 50 μA. As will be readily appreciated by those skilled in the art, it is extremely difficult and costly to design a voltage regulator circuit where the reference voltage is so close to the regulating voltage.

SUMMARY OF THE INVENTION

According to the present invention, a power supply for regulating energy delivered to a power consuming apparatus operating at low current levels includes a power source comprising at least one battery for generating an output voltage greater than a desired operating level. The power supply further includes a voltage regulator circuit comprising a light emitting diode (LED). The light emitting diode, which is preferably configured as a gallium arsenide diode, operates at a substantially constant voltage within a current range of between 10 to 25 μA (micro amperes). As a result, reliable and economical voltage regulating circuits can be constructed with substantially improved performance, as compared to circuits utilizing zener diodes as the active voltage regulating component, at the very low current levels required for such applications as line powered telecommunication devices.

The various features of novelty which characterize the invention are pointed out with particularity in the claims annexed to and forming a part of the disclosure. For a better understanding of the invention, its operating advantages, and specific objects attained by its use, reference should be had to the accompanying drawings and descriptive matter in which there are illustrated and described several embodiments of the invention.

BRIEF DESCRIPTION OF THE DRAWING

The features and advantages of the present invention will be more readily understood from the following detailed description when read in conjunction with the accompanying drawings, in which.

DETAILED DESCRIPTION

Initially, it should be noted that although the use of a light emitting diode as an active component in a voltage regulating circuit in accordance with the present invention is described in detail in connection with the illustrative example of a telecommunications device, it is contemplated that the teachings of the present invention may be extended to many other applications and devices in which it is necessary to provide a regulated voltage at very low current levels (i.e., substantially below 50 μA).

Figure 1:
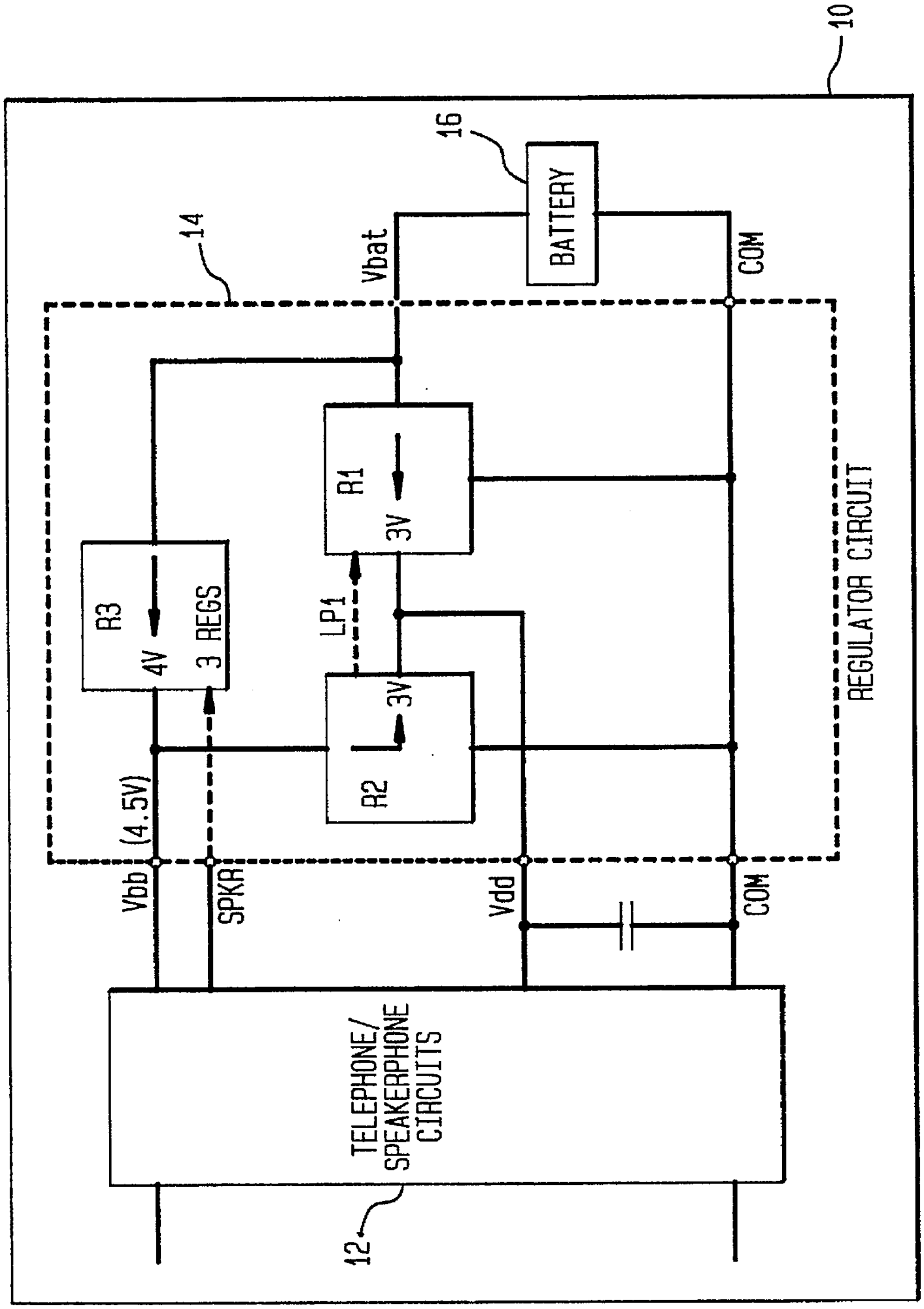
FIG. 1 (PRIOR ART)
FIG. 1 is a block diagram depicting a conventional telephone/speaker phone device employing a battery voltage regulator circuit operating at low current levels (e.g., between 10 to 25 μA)

In any event, and with initial reference to FIG. 1, there is shown an illustrative telecommunications device such, for example, as a conventional line powered telephone. In a known manner, telecommunications device 10 includes conventional speakerphone operating and control circuitry generally identified by reference numeral 12. To ensure that the proper voltage is supplied to terminals Vdd and Vbb of circuitry 12, device 10 further includes a regulator circuit 14, comprising individual regulator subcircuits R1, R2, and R3. When telecommunications device 10 is off-hook, regulator subcircuit R2 receives power directly from the telephone line (not shown) and produces an output voltage which is at the desired operating level Vdd. As will be readily ascertained by those skilled in the art, the output voltage is maintained at a substantially constant level, illustratively 3 volts, despite fluctuations in the line voltage Should the output voltage fall to below a predetermined threshold, power is no longer supplied from regulator subcircuit R2 but is instead supplied from a secondary power supply 16 via regulator subcircuit R1. Typically, the secondary power supply comprises one or more batteries. As will be readily appreciated by those skilled in the art, as such batteries are discharged, the voltage may fall from, for example, 6.5 to 3.5 volts. Thus, regulator subcircuit R2 is configured to decrease the reduction in the output voltage in response to decreases in the output voltage and to increase, if applicable, the reduction of the output voltage in response to increases in the output voltage.

In the illustrative speaker telephone application depicted in FIG. 1, it is necessary to supply a greater voltage level to the speaker phone circuitry. In a well known manner, fluctuations in line voltage are compensated for by utilizing the secondary power supply via regulator subcircuit R3.

Figure 2:
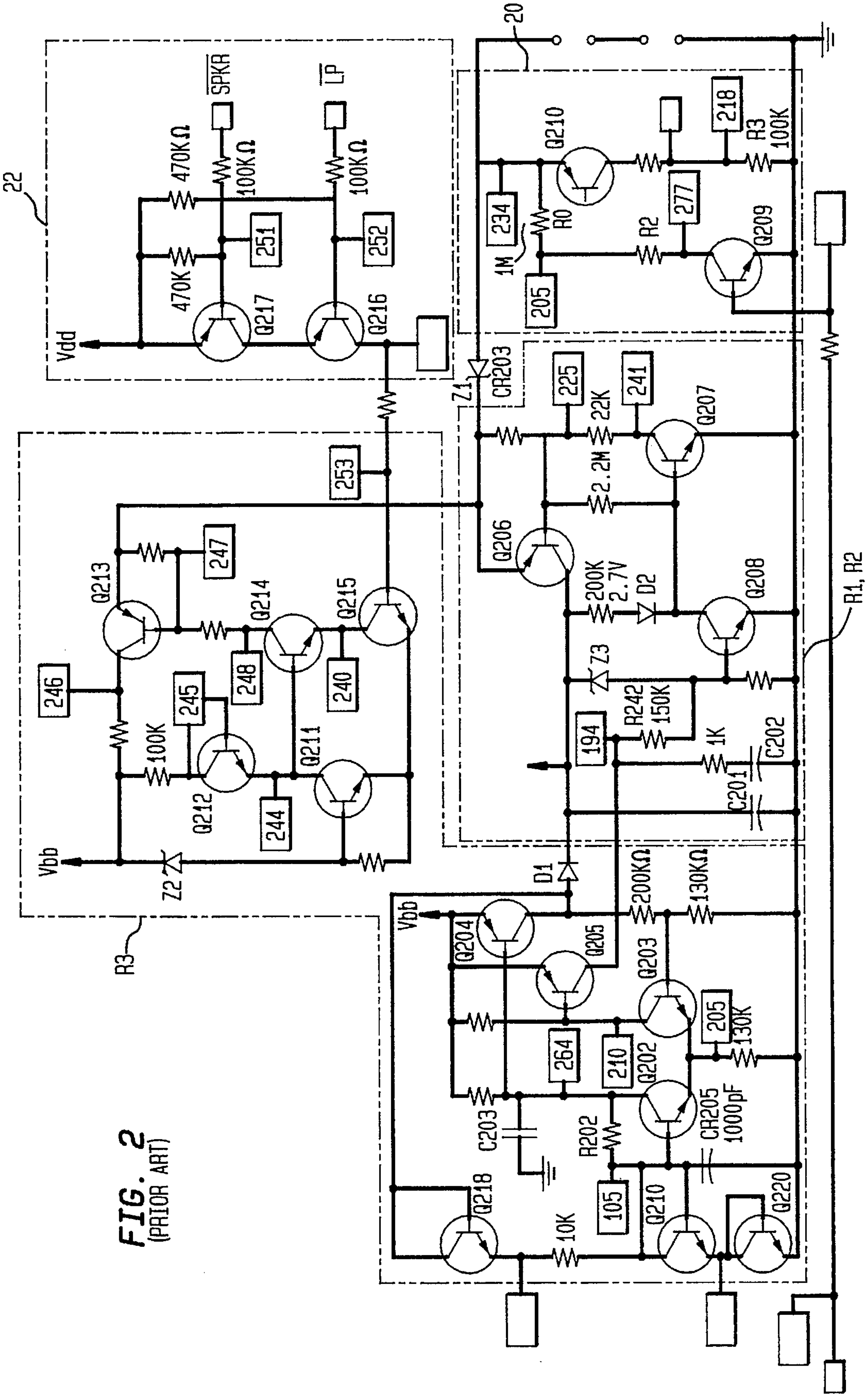
FIG. 2 (PRIOR ART)
FIG. 2 is a schematic diagram of a battery voltage regulator circuit of the type conventionally utilized in the device of FIG. 1, the regulator circuit employing a zener diode as the active voltage regulating component.
Figure 3:
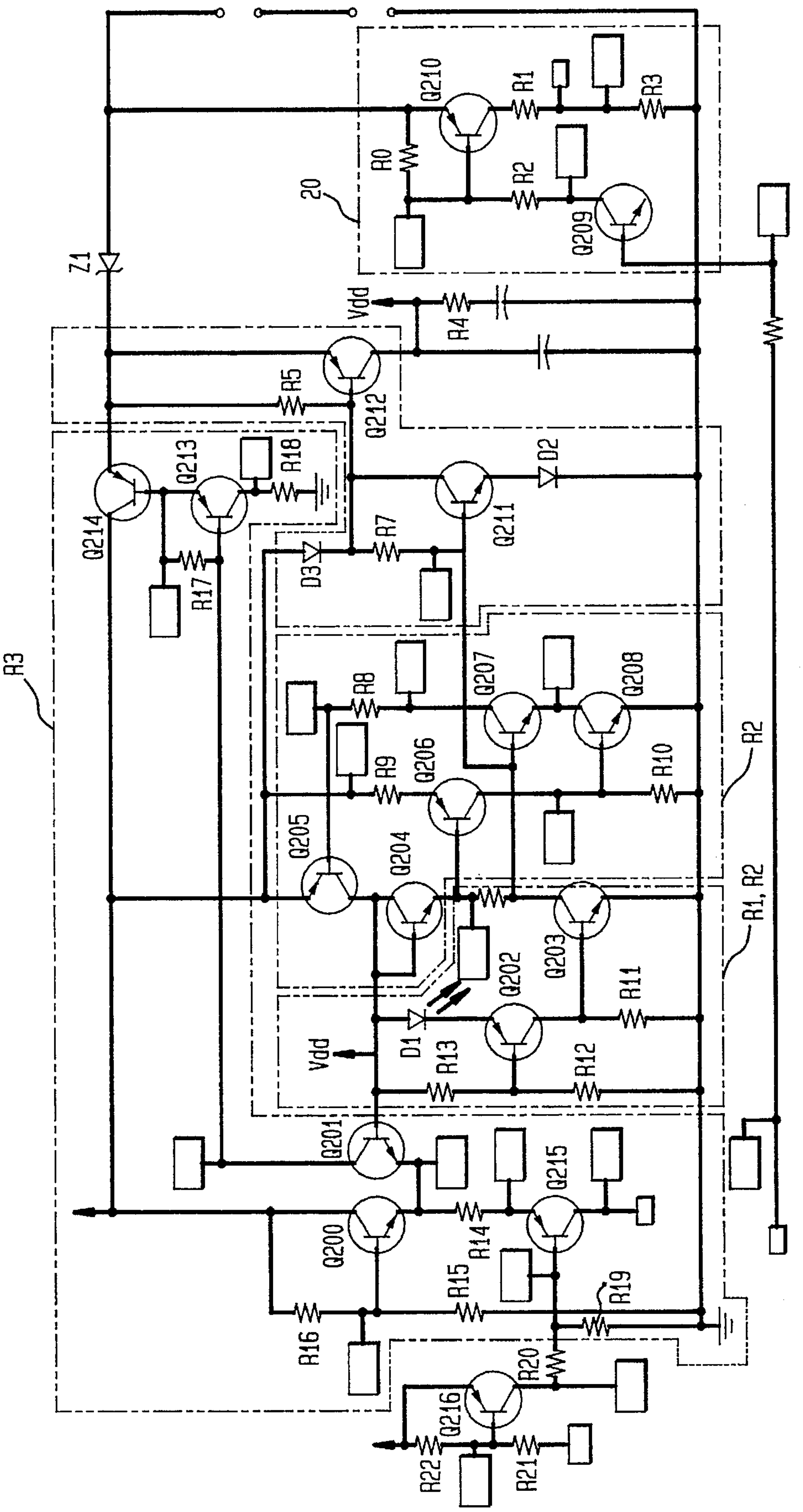
FIG. 3 is a schematic diagram of a battery voltage regulator circuit employing a gallium arsenide LED in accordance with the present invention.

With simultaneous reference now to FIGS. 2 and 3, there are shown, respectively, a conventional low current, regulated power supply constructed utilizing a zener diode Z3 as the active voltage regulating component and a low current, regulated power supply employing a gallium arsenide LED D1 as the active voltage regulating component in accordance with the present invention.

Figure 4:
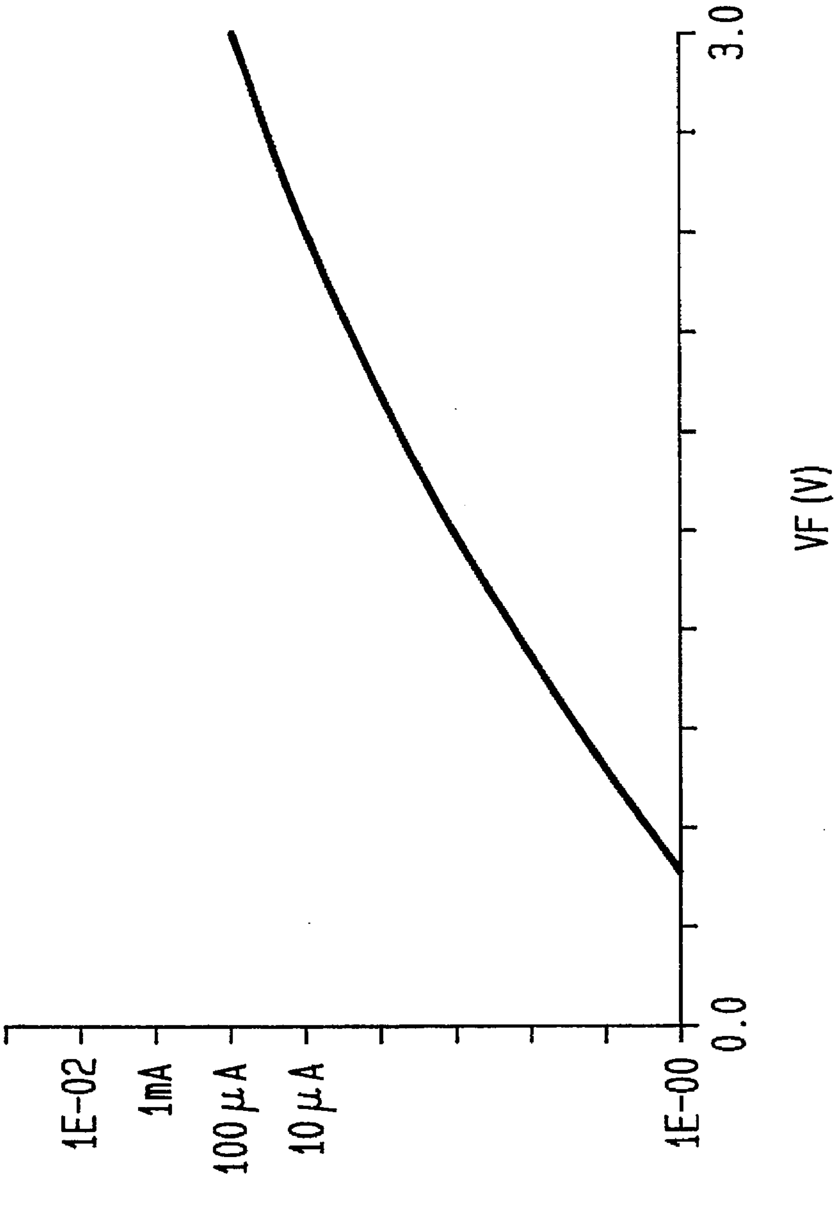
FIG. 4 is a graphical plot depicting the voltage of the zener diode of FIG. 2 at current levels between 0 to 100 μA.
Figure 5:
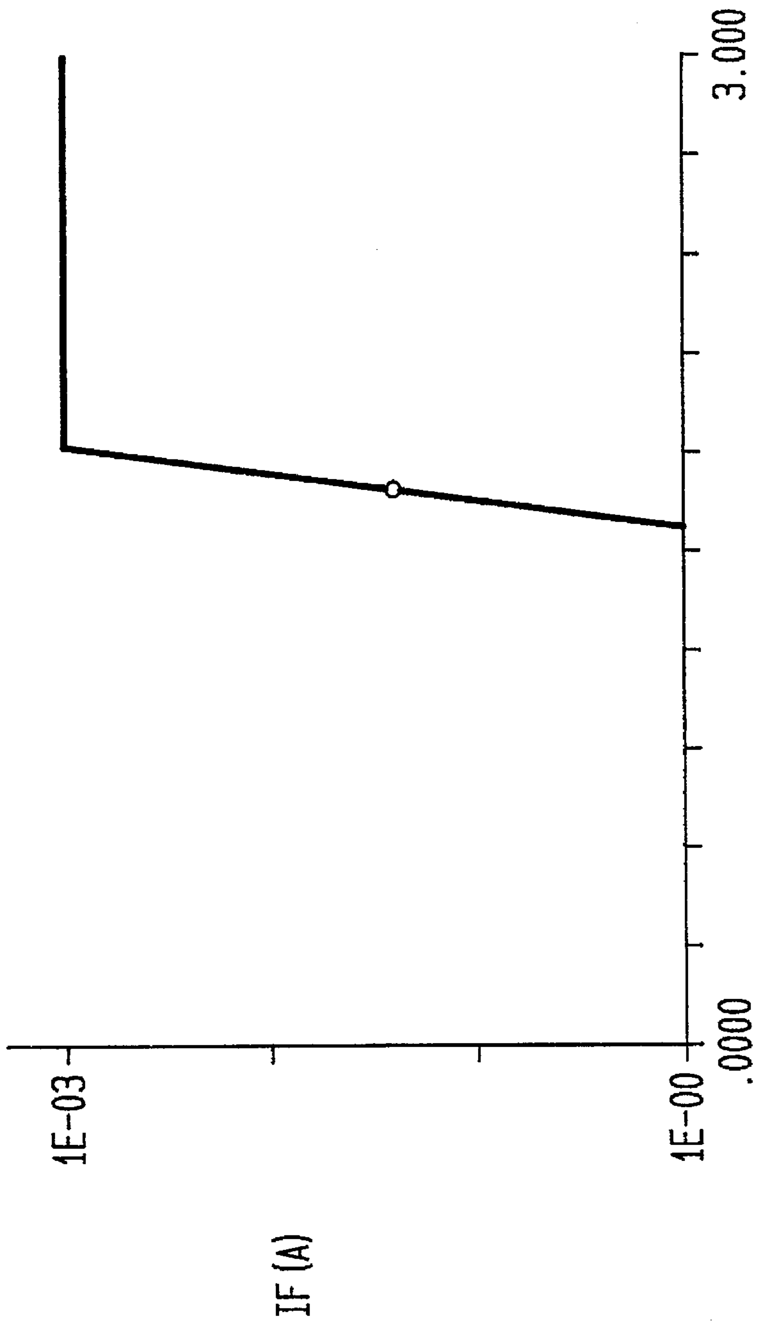
FIG. 5 is a graphical plot depicting the voltage of the LED of FIG. 3 at current levels between 0 to 100 μA.

Graphical plots of voltage output across a 2.7 V rated zener diode Z3, as utilized in the conventional circuit of FIG. 2 and a commercially available gallium arsenide LED D1 supplied as Cat. No. LTL16KG by Philips, Inc., as utilized in the modified circuit of FIG. 3, are shown in FIGS. 4 and 5 over an illustrative current range of 10 to 25 μA. With initial reference to FIG. 4, it will be readily ascertained that the zener diode exhibits a significant variation in voltage as the operating current increased from 10 to 100 μA. An overall change of 0.6 volts was recorded for between the upper and lower limits of this operating current range. As will be immediately apparent from FIG. 5, however, very little variation was exhibited by the gallium arsenide diode over the same operating current range. In fact, the overall change in voltage between 10 and 100 μA was only 0.15 volts. Thus, it can be seen that the gallium arsenide diode provides superior voltage regulation at low current applications.

Figure 6:
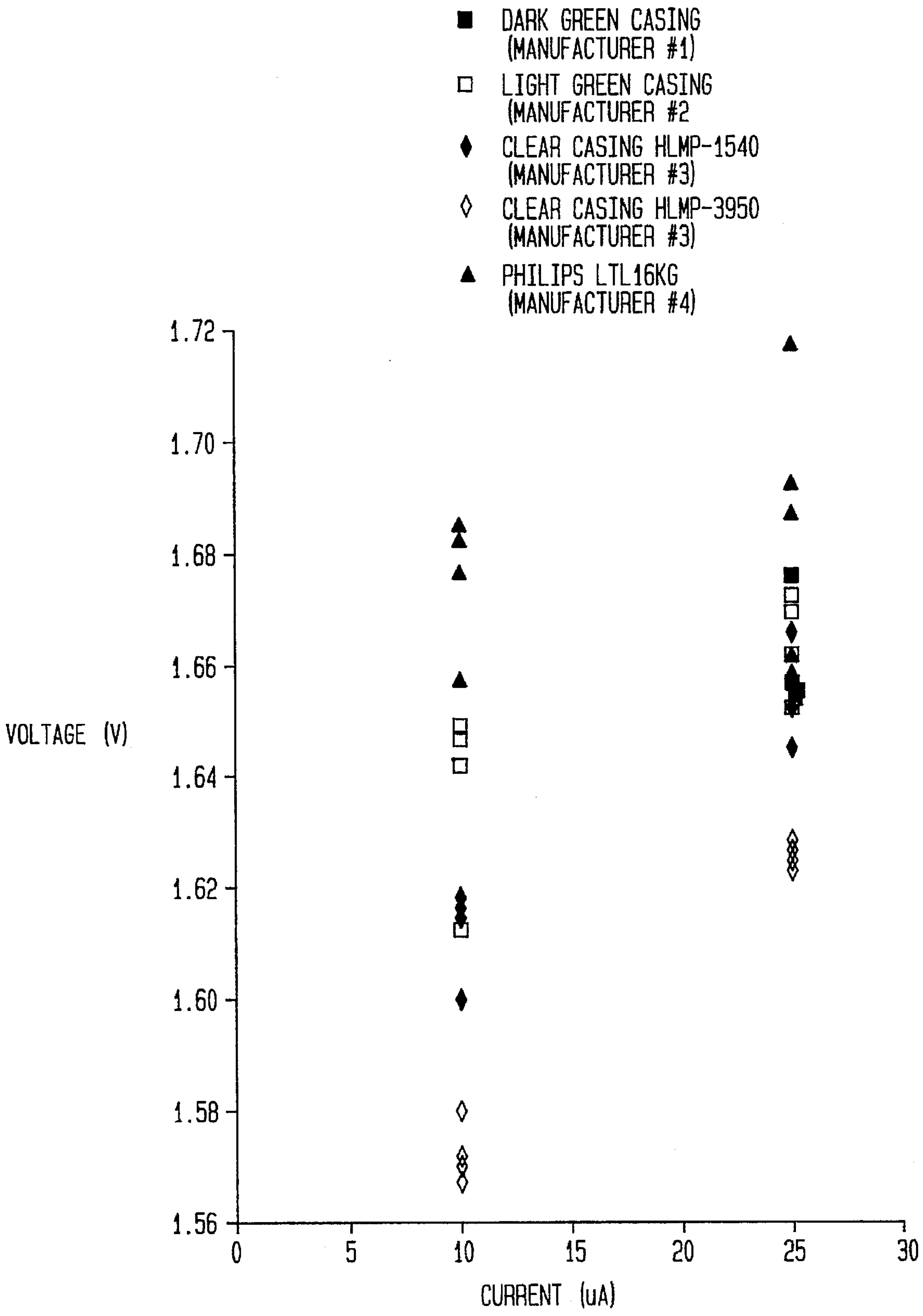
FIG. 6 is a graphical plot depicting the voltage of the LED of FIG. 3 at current levels of 10 μA and 25 μA, respectively.

FIG. 6 represents a comparison of five different gallium arsenide LED's supplied by four different manufacturers. The voltage across four devices of each model was measured tested at current levels of both 10 and 25 μA. As can be seen from FIG. 6, repeatability of the results was superior for each model, with the HLMP-3950 diode exhibiting excellent repeatability at both current levels tested. It can thus be seen that reliable voltage regulating circuits can be constructed with substantially improved performance, as compared to circuits utilizing zener diodes as the active voltage regulating component, at the very low current levels required for such applications as line powered telecommunication devices.

In addition to the superior performance obtained by gallium arsenide diodes as low current, voltage regulating components in accordance with the present invention, it should also be noted that a substantial reduction in cost is also achieved. The 2.7 volt, 50 μA zener evaluated herein is currently available at a cost of between 10 and 11 cents. In large part, this cost reflects the large number (approximately two-thirds) of zeners which are rejected after the individual testing that must be undertaken for each diode. The commercially available gallium arsenide LED's evaluated, on the other hand, are available for approximately 3 cents. In an industry where cutting costs by a penny is considered a significant cost reduction, the savings afforded by the utilization of gallium arsenide LED's as voltage regulating components in accordance with the present invention are quite substantial.

From the foregoing, it should be readily ascertained that the invention is not limited by the embodiments described above which are presented as examples only but may be modified in various ways within the intended scope of protection as defined by the appended patent claims.

What is claimed:

1. A power supply for regulating energy delivered to a power consuming apparatus, said power supply comprising:

a power source, said power source comprising at least one battery for generating an output voltage greater than a desired operating level; and means for regulating said power source when said power source is supplying power to the power consuming apparatus, said power regulating means comprising a gallium arsenide light emitting diode (LED) and being operable to regulate said output voltage at a current level of less than 50 micro amperes.

2. The power supply of claim 1, wherein said means for regulating is operative to reduce said output voltage to said desired operating level and to decrease the reduction of said output voltage in response to decreases in said output voltage and to increase the reduction of said output voltage in response to increases in said output voltage.

3. The power supply of the claim 1, wherein said current level is between 10 to 25 micro amperes.

4. The power supply of claim 1, wherein said output voltage is between from 3.5 to 6.5 volts.

5. A telephone line powered telecommunications device comprising:

a microphone;

a speaker;

circuitry for operating and controlling the telecommunications device;

terminals connectable to a telephone line to thereby receive primary power therefrom;

a secondary power source, said secondary power source comprising at least one battery for generating an output voltage greater than a desired operating level;

means for switching from said primary power to said secondary power source when energy received from said telephone line falls below a threshold value; and means for regulating said secondary power source when said secondary source is supplying power to said operating and control circuitry, said secondary power regulating means comprising a gallium arsenide light emitting diode for reducing said output voltage to said desired operating level at an operating current level of less than 50 micro amperes.

6. The telecommunications device according to claim 5, wherein said output voltage is between from 3.5 to 6.5 volts.

7. The telecommunications device according to claim 5, wherein said operating current level is between from 10 to 25 micro amperes.

8. The telecommunications device according to claim 5, further including means for regulating power received from said telephone line.

* * * * *